(12) United States Patent
Ueda et al.

(10) Patent No.: US 6,314,064 B1
(45) Date of Patent: Nov. 6, 2001

(54) OPTICAL PICKUP DEVICE AND OPTICAL DISC DEVICE

(75) Inventors: Mitsunori Ueda, Chiba; Takeshi Kubo; Junichi Suzuki, both of Kanagawa; Satoshi Sakamoto; Hiroshi Kawamura, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/172,621

(22) Filed: Oct. 15, 1998

(30) Foreign Application Priority Data

Oct. 17, 1997 (JP) .................................................. 9-285895

(51) Int. Cl.[7] .................................................. G11B 7/12
(52) U.S. Cl. .................................... 369/44.23; 369/44.17; 369/112.24
(58) Field of Search .............................. 369/44.23, 44.27, 369/44.12, 44.14, 44.15, 44.17, 44.28, 44.37, 47.1, 53.1, 53.41, 112.01, 112.23, 112.24, 112.25, 112.26

(56) References Cited

U.S. PATENT DOCUMENTS

| | | | |
|---|---|---|---|
| 5,712,842 | 1/1998 | Yamamoto et al. | 369/112 |
| 5,764,613 | 6/1998 | Yamamoto et al. | 369/112 |
| 6,167,003 | * 12/2000 | Haneji et al. | 369/44.23 |

FOREIGN PATENT DOCUMENTS

| | | |
|---|---|---|
| 0 769 777 A2 | 4/1997 | (EP) . |
| 0 777 222 A1 | 6/1997 | (EP) . |
| 8-22772 | 8/1996 | (JP) . |
| 97/24717 | 7/1997 | (WO) . |
| 97/39446 | 10/1997 | (WO) . |

* cited by examiner

*Primary Examiner*—Muhammad Edun
(74) *Attorney, Agent, or Firm*—Ronald P. Kananen; Rader, Fishman & Grauer

(57) ABSTRACT

An optical pickup device has a first optical system including a double lens type lens unit having a forward lens arranged facing an optical disc and a backward lens having an optical axis coincident with the forward lens. The optical pickup device also has a second optical system including an objective lens and first and second gap detection photodetectors for detecting the separation between the signal readout surface of the optical disc and the forward lens of the double lens type lens unit. The optical pickup device also includes a bobbin provided with the double lens type lens unit of the first optical system and with the objective lens of the second optical system and an electromagnetic driving unit for driving the bobbin in a first direction parallel to the optical axis of the objective lens and that of the forward lens of the double lens type lens unit and in a second direction normal to the optical axes. With the optical pickup device, the objective lens unit can be improved in operational reliability and the device in its entirety can be reduced in size.

21 Claims, 8 Drawing Sheets

OPTICAL PICKUP DEVICE AND OPTICAL DISC DEVICE

BACKGROUND OF THE INVENTION

1. Field of the Invention

This invention relates to an optical pickup device for reproducing information signals from an optical disc or an magneto-optical disc.

2. Description of the Related Art

A optical disc is known for reproducing information signals, such as an optical disc or a magneto-optical disc. This type of the optical disc is used for recording acoustic signals or data processed in an information processing apparatus, such as a computer, and has a diameter of 120 or 80 mm and a thickness of 1.2 mm. Among different types of the optical disc, a so-called compact disc (CD) is known. Among the different types of the CD, there is such CD termed compact disc recordable (CD-R) or a compact disc rewritable (CD-RW) on which can be written information signals. In the CD, CD-R or CD-RW, the reflecting surface as a signal recording surface is formed at a position of approximately 1.1 mm inwardly from the surface of one of the signal readout surfaces.

Also, with the recent preference to multi-media of information signals, there is a demand for diversification and voluminousness of information signals, such as picture data or acoustic data handled at a time. For meeting this demand, there is known, as an optical disc aimed at minimizing the medium size while realizing high recording density, a laminated disc obtained on bonding two optical discs each having a diameter of 120 mm and a thickness of 0.6 mm to provide an entire thickness of 1.2 mm, or a laminated optical disc obtained on laminating an optical disc 0.6 mm in thickness and a reinforcement disc 0.6 mm in thickness to provide an entire thickness of 1.2 mm. This optical disc is generally termed a digital video disc (DVD). That is, with this DVD, the reflective surface as a signal recording surface is formed at a position of 0.6 mm inwardly from one of the readout surfaces.

As an optical disc which realizes high recording density without narrowing the tolerance due to the disc tilt, there is also proposed an optical disc having a diameter of 120 mm and a thickness of 0.1 mm and a reinforcement disc having a thickness of 1.1 mm to provide an entire thickness of 1.2 mm. This optical disc is herein termed a high recording density disc. With this high recording density disc, the reflective surface, as a signal recording surface, is formed at a position of 0.1 mm inwardly from one of the signal readout surfaces.

As an optical pickup device for reproducing information signals from this high recording density disc, there is proposed such a device provided with a double-lens type objective lens having two lenses having the optical axes coincident with each other, as disclosed in U.S. Pat. No. 5,712,842 or U.S. Pat. No. 5,764,613. This double lens type objective lens is made up of a first lens arranged facing the high recording density disc, and a second lens having its optical axis coincident with the optical axis of the first lens. By the first and second lenses, a numerical aperture NA not less than 0.7 is realized. The first and second lenses are termed herein as a forward lens and a backward lens, respectively.

However, if, with the above-described optical pickup device, information signals are to be reproduced from the high recording density disc, with the numerical aperture NA of the objective lens unit of 0.85, the operating distance between the signal readout surface of the high recording density disc and the forward lens of the objective lens unit, referred to herein as the working distance, is 0.1 mm, with the surface spot diameter on the signal recording surface of the high recording density disc being of the order of 100 $\mu$m.

The working distance and the surface spot diameter in case of reproducing the CD or the DVD are not less than 1.2 mm and 1 mm, respectively. As compared to these values, the optical pickup device used for the high recording density disc has a working distance and a surface spot diameter of significantly small values.

Thus, the above-mentioned optical pickup device has a drawback that, if there is contamination, such as dust and dirt of the order of 1 mm or micro-sized flaws on the signal recording surface, focussing servo or tracking servo of the objective lens unit is disengaged.

Therefore, if, with the above-described optical pickup device, the focussing servo of the objective lens unit is disengaged, the movable parts, such as an objective lens unit, collides against the high recording density disc, because the working distance is of the order of 0.1 mm.

With the optical pickup device, it is contemplated to employ a reflection type photosensor or a capacitance detection sensor for controlling the small working distance to prevent the collision of the objective lens unit against the high recording density disc. However, there is raised an inconvenience that the device is poor in operational reliability and that the optical pickup device tends to be increased in size.

SUMMARY OF THE INVENTION

It is therefore an object of the present invention to provide all optical pickup device capable of improving the operational reliability of the objective lens unit and reducing the size of the optical pickup.

The present invention provides an optical pickup device including a first optical system including an objective lens unit which is made up of a first lens arranged facing an optical disc and a second lens arranged with its optical axis coincident with the optical axis of the first lens, a second optical system having an objective lens and gap detection means for detecting the separation between a signal readout surface of the optical disc and the first lens of the objective lens unit, a bobbin carrying the objective lens unit of the first optical system and the second lens of the second optical system and driving means for causing movement of the bobbin in a first direction parallel to the optical axes of the objective lens and the first lens of the objective lens unit and in a second direction perpendicular to the optical axes.

The optical pickup device according to the present invention also includes gap detection means for reading out and reproducing information signals from an optical disc having a position of the signal recording surface thereof along the disc thickness different from that of another optical disc.

The first optical system of the optical pickup device according to the present invention includes focussing servo means for maintaining a constant separation between the first lens of the objective lens unit and the signal recording surface of the optical disc with a pull-in range not less than ±2 $\mu$m and not larger than ±10 $\mu$m;

the gap detection means of the second optical system having a pull-in range broader than that of the focussing servo means.

With the above-described optical pickup device, the gap detection means of the second optical system detects the separation between the first lens of the objective lens unit of the first optical system and the optical disc when the optical disc is to be reproduced by the first optical system.

With the optical pickup device, the gap detection means of the second optical system reads out and reproduces the information signals from an optical disc having a position of the signal recording surface thereof along the disc thickness different from that of another optical disc.

Also, with the optical pickup device, if the first lens of the objective lens unit is moved away from the pull-in range of the focussing servo means of the first optical system, due to, for example, disturbances, when the first optical system reproduces the optical disc, the first lens is moved by the gap detection means into the pull-in range of the focussing servo means.

With the optical pickup device according to the present invention, since the gap detection means detects the axial separation between the optical disc and the objective lens unit, the objective lens can be prevented from colliding against the optical disc to improve operational reliability of the objective lens unit. Also, since the objective lens unit and the objective lens are provided on the same bobbin, the entire device can be reduced in size.

With the optical pickup device of the present invention, the optical discs of different specifications having different positions along the thickness of the signal recording surface can be reproduced.

Moreover, if, when the optical disc is being reproduced by the first optical system, the objective lens unit is moved away from the focussing servo pull-in range, as found by the gap detection means, the objective lens unit can be promptly moved to within the focussing servo pull-in range, thus reliably preventing collision of the objective lens against the optical disc.

DESCRIPTION OF THE PREFERRED EMBODIMENTS

Figure 1:
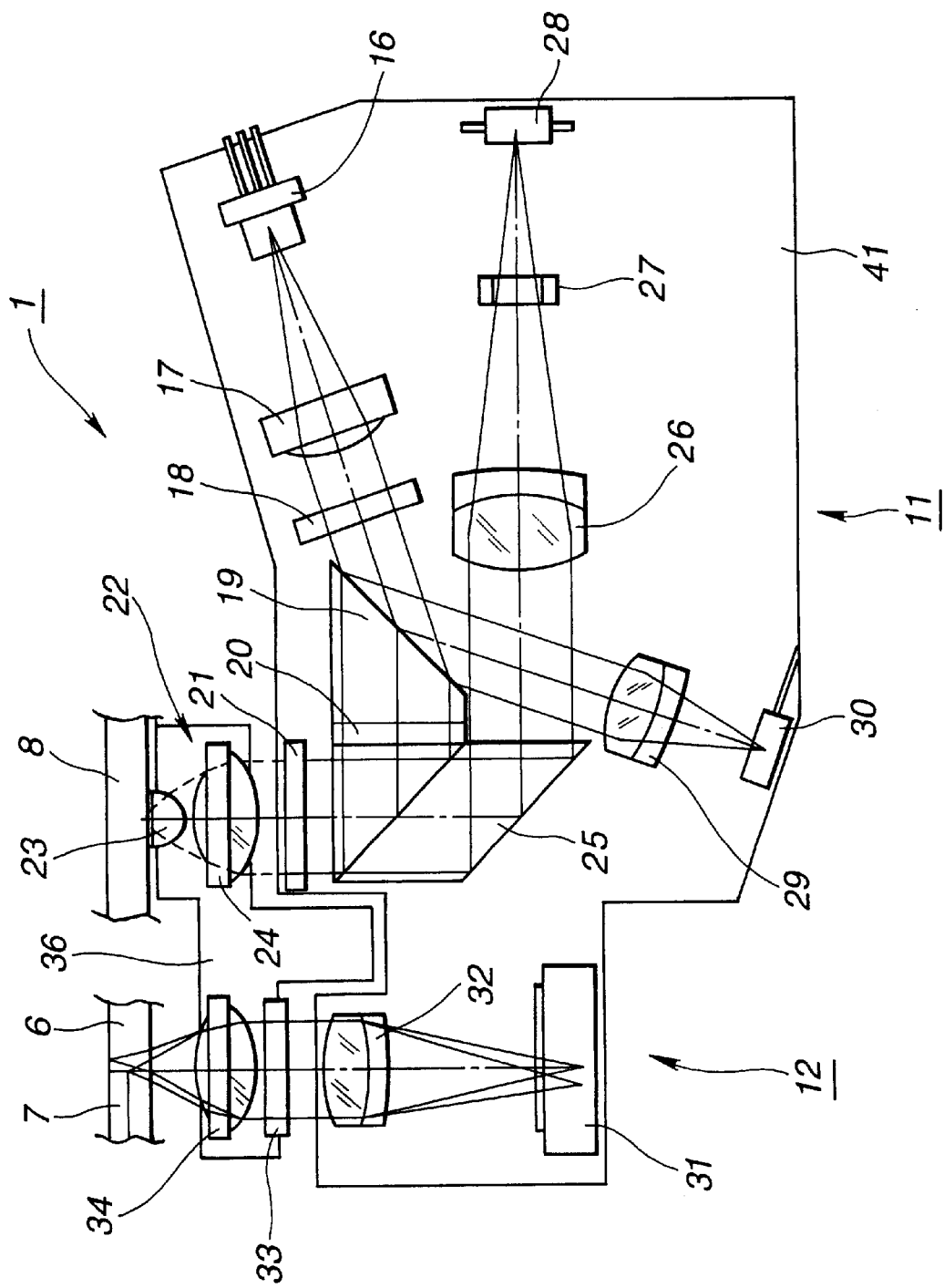
FIG. 1 is a schematic view showing first and second optical systems of an optical pickup device according to the present invention.

Referring to the drawings, preferred embodiments of an optical pickup device according to the present invention will be explained in detail. This optical pickup device 1 has a diameter of 120 mm or 80 mm and a thickness of 1.2 mm and is used for recording/reproducing a compact disc, which is a first optical disc 6, having mainly acoustic signals recorded thereon, or a compact disc recordable (CD-R) and/or a compact disc rewritable (CD-RW) capable of writing and recording information signals. The present optical pickup device is also used for recording or reproducing a digital video disc (DVD) which is a second optical disc 7 obtained by bonding two optical discs each having a diameter of 120 mm and a disc substrate thickness of 0.6 mm to provide an overall thickness of 1.2 mm and having information signals, such as video signals, recorded to a higher density than on the first optical disc 6. The optical pickup device is further used for recording or reproducing a high recording density disc which is a third optical disc 8 obtained by bonding an optical disc having a diameter of 120 mm and a disc substrate thickness of 0.1 mm and a disc reinforcement plate to provide an overall thickness of 1.2 mm and having information signals recorded to a higher density than on the second optical disc 7.

The CD or CD-R, that is the first optical disc 6, to which the optical pickup device according to the present invention is applied, has a reflecting surface, that is a signal recording surface, formed at a position of approximately 1.1 mm from the signal readout surface in the direction of disc thickness. The DVD, that is the second optical disc 7, to which the optical pickup device 1 is applied, has the reflective surface, that is, the signal recording surface, formed at a position of apparatus 0.6 mm from the signal readout surface in the direction of disc thickness. The high recording density disc, that is, the third disc 8, to which the optical pickup device 1 is applied, has the reflective surface, that is, the signal recording surface, formed at a position of apparatus 0.1 mm from the signal readout surface in the direction of disc thickness.

Thus, the present optical pickup device 1 has compatibility in the sense that the device can reproduce information signals from the first, second and third optical discs 6, 7 and 8 having different positions of the signal recording surfaces along the disc thickness by having different disc substrate thicknesses.

Referring to FIG. 1, the optical pickup device 1 has a first optical system 11 for reproducing the third optical disc and a second optical system 12 for reproducing the first optical disc 6 or the second optical disc 7.

Still referring to FIG. 1, the first optical system 11 of the optical pickup device includes, in the arraying order on the optical path, a light source 16 for radiating laser light of a short wavelength of 670 nm or less, a collimator lens 17 for collimating the laser light radiated from the light source 16, a diffraction lattice 18 for diffracting the laser light into three beams, a half wave plate 20 for producing an optical path difference in the P linear polarized light and the S polarized light in the laser light, a quarter wave plate 21 for converting the linear polarized light into circular polarized light and a double lens type objective lens unit 22 for focussing the laser light on the signal recording surface of the third optical disc 8. The light source 16 has a semiconductor laser for radiating the laser light for radiating the laser light having a wavelength not longer than 670 nm, such as 635 nm or 515 nm.

The double lens type objective lens 22 includes a first lens 23, referred to herein as a forward lens 23, arranged facing the signal readout surface of the third optical disc 8, and a second lens 24, referred to herein as a backward lens 24, having the optical axis coincident with the optical axis of the forward lens 23. The double lens type objective lens unit 22 has the numerical aperture NA by the forward lens 23 and the backward lens 24 equal to not less than 0.7, such as 0.85. The working distance of the forward lens 23 is set to not less than 5 μm and not larger than 50 μm. By setting the working distance in this range, it is possible to prevent the double lens type objective lens unit from colliding against the dust and dirt on the disc or to prevent the collision otherwise caused by disc skew.

The double lens type objective lens unit 22 has adjustment means, not shown, operating so that, for reducing aberration otherwise caused by variation in thickness of the third disc 8, the backward lens 24 and the forward lens 23 will be relatively movable along the optical axis to adjust the separation between the forward lens 23 and the backward lens 24 along the optical axis.

Referring to FIG. 1, the first optical system 11 includes a polarization beam splitter 25 for reflecting the laser light radiated from an anamorphic prism 19 to cause the reflected laser light to fall on the quarter wave plate 21 and for transmitting the reflected laser light from the optical disc 8 to be transmitted therethrough, a collimator lens 26 and a multi-lens 27 for condensing the reflected laser light transmitted through the polarization beam splitter 25, and a photodetector 28 for receiving the reflected laser light from the signal recording surface of the third optical disc 8.

Still referring to FIG. 1, the first optical system 11 includes a condenser lens 29 for condensing the laser light reflected from the anamorphic prism 19, and an output adjustment photodetector 30 for receiving the laser light condensed by the condenser lens 29 for automatically adjusting the output of the laser light radiated from the light source 16 based on the amount of light reception.

Further referring to FIG. 1, the second optical system 12 of the optical pickup device 1 includes a laser coupler 31 having unified light emitting and light receiving elements for radiating two sorts of the laser light having different wavelengths and for receiving the reflected laser light from the first and second optical discs 6, 7, a collimator lens 32 for collimating the laser light radiated from the laser coupler 31, a hologram element 33 for diffracting part of the laser light transmitted through the collimator lens 32 and an objective lens 34 for focussing the laser light transmitted through the hologram element 33 on the signal recording surfaces of the first and second optical discs 6, 7. The hologram element 33 is adapted to diffract part of the laser light transmitted therethrough to provide different focal lengths for the diffracted laser light and the non-diffracted laser light.

Figure 2:
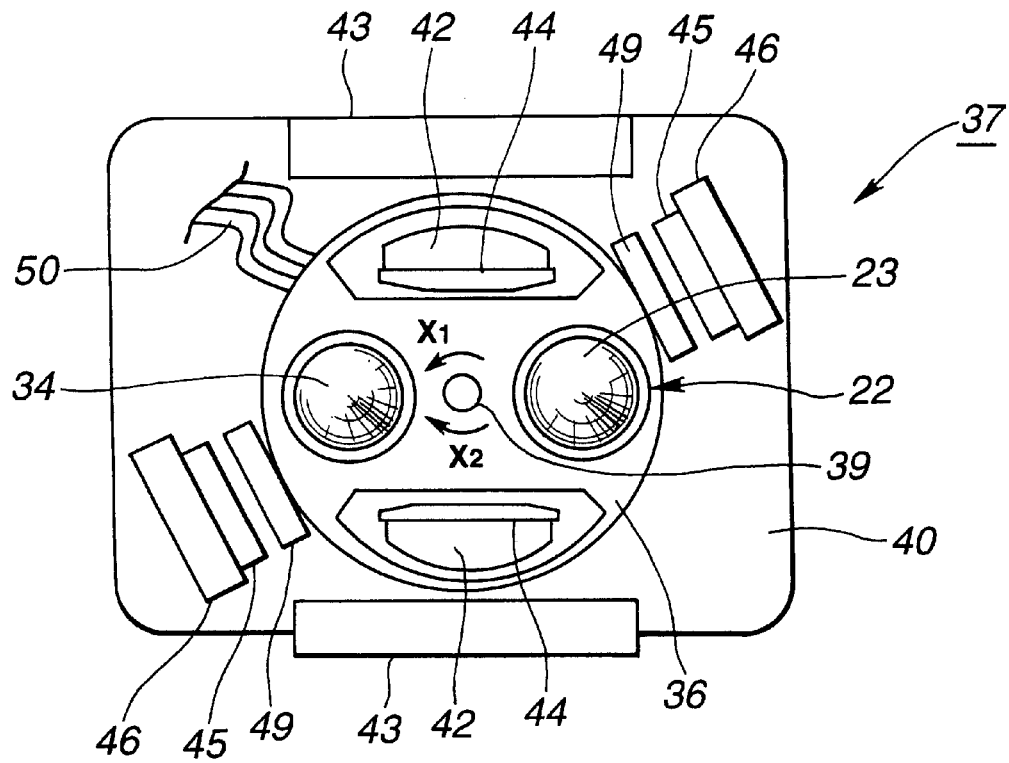
FIG. 2 is a plan view showing a bobbin and an electromagnetic driving unit provided on the optical pickup device.
Figure 3:
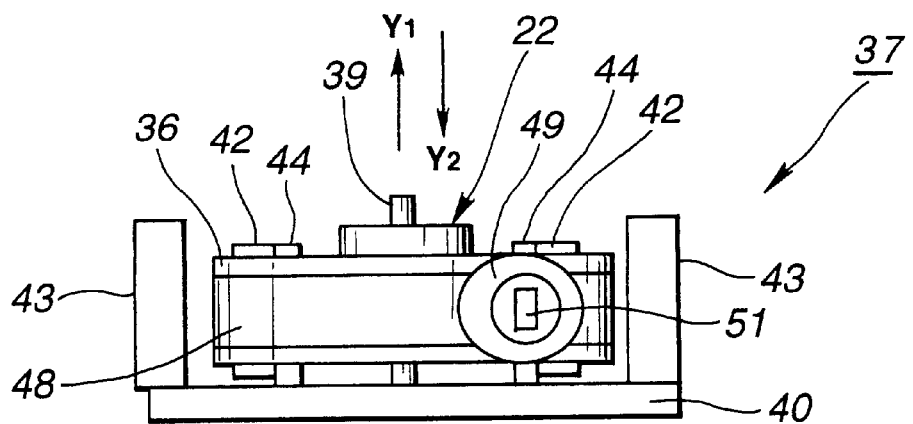
FIG. 3 is a side view showing the bobbin and the electromagnetic driving unit.

The optical pickup device 1 includes a bobbin 36 for mounting thereon a double lens type objective lens unit 22 of the first optical system 11 and the objective lens 34 of the second optical system 12, and an electromagnetic driving unit 37 (FIGS. 2, 3) for causing movement of the bobbin 36 in two mutually perpendicular directions, namely the direction shown by arrows X1 and X2 in FIG. 2 and the direction shown by arrow Y1 and Y2 in FIG. 3.

The bobbin 36 is shaped substantially as a cylinder having a top plate and has its mid portion supported by a pivot 39, as shown in FIG. 2. The bobbin 36 is supported for sliding along and for rotation about the axis of the pivot 39. The bobbin 36 is held at a neutral position by a neutral point supporting mechanism constituted by a metal piece 51 and a magnet 45 on a supporting base block 40 on which is mounted upright the pivot 39.

Figure 4:
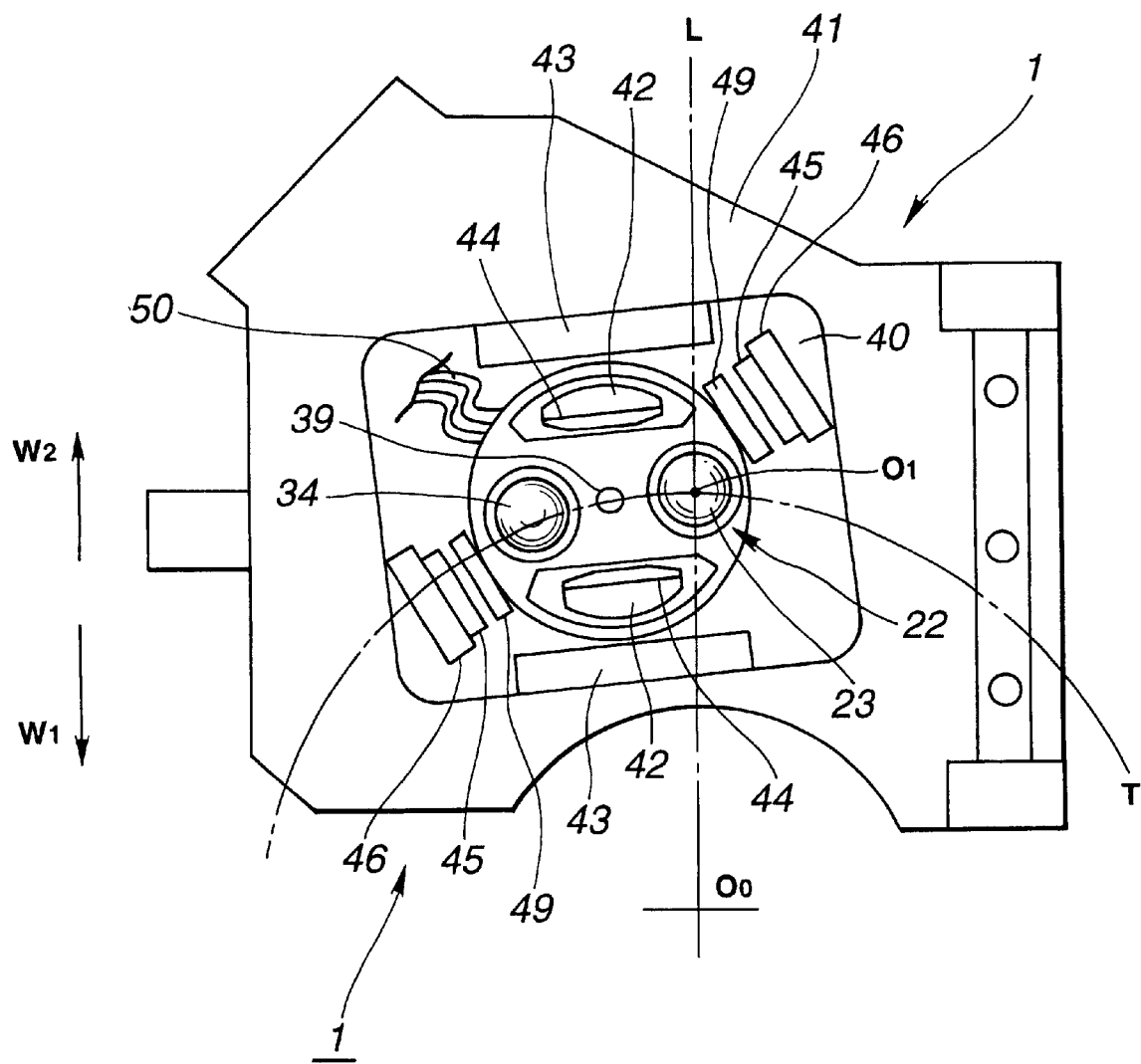
FIG. 4 is a plan view showing the positions of the double lens type objective lens unit and the objective lens provided on the optical pickup device.

The bobbin 36 carries the double lens type objective lens unit 22 and the first objective lens 34 so that the center $O_l$ of the first objective lens 34 of the double lens type objective lens unit 22 is on a straight line L passing through the center of rotation $O_0$ of the first to third optical discs 6 to 8, as shown in FIG. 4. This straight line L is parallel to the direction of movement of the optical block 4 as indicated by W1 and W2 in FIG. 4. Thus, in the bobbin 36, the track direction T of the first to third optical discs 6 to 8 is positioned astride the double lens type objective lens unit 22 and the objective lens 34.

Although the double lens type objective lens unit 22 is arranged on the straight line L passing through the center of rotation $O_0$ of the first to third optical discs 6 to 8, the double lens type objective lens unit 22 may also be arranged so that the center of the objective lens 34 is positioned on this straight line L. The double lens type objective lens unit 22 positioned on this straight line L traversing the center of rotation $O_0$ of the optical discs 6 to 8 is not changed in the tilt of the recording track by the position of the optical pickup device 1 so that the double lens type objective lens unit 22 undergoes deviation in the tangential direction of the optical discs 6 to 8 to a lesser extent. Thus, the double lens type objective lens unit 22 positioned on this straight line is not placed under restrictions in setting the detection method for information signals and hence has a wide latitude for setting.

The supporting base block 40 supporting the bobbin 36 is mounted on an optical block 41, which is supported for movement along the axis of the driving shaft and the guide shaft, not shown, that is in the direction indicated by arrows W1 and W2, as shown in FIG. 4. That is, the bobbin 36 is provided for movement in the tracking direction in the radial direction of the first to third optical discs 6 to 8.

The bobbin 36 is slid along the axis of the pivot 39 by being driven by the electromagnetic driving unit 37, and is also rotated about the pivot 39. That is, the bobbin 36 is driven and displaced along the axis of the pivot 39 so that the double lens type objective lens unit 22 and the objective lens 34 are driven and displaced in the first direction parallel to their optical axe to perform focussing control for the first to third optical discs 6 to 8. On the other hand, the bobbin 36 is rotated about the pivot 39 so that the double lens type objective lens unit 22 and the objective lens 34 are driven and displaced in the second direction perpendicular to their optical axes to perform tracking control for the first to third optical discs 6 to 8.

Referring to FIGS. 2 and 3, the electromagnetic driving unit 37 for driving and displacing the bobbin 36 includes a magnetic driving unit 37, focussing coil 48 and a tracking coil 49. The magnetic driving unit 37 includes a focussing magnet 42, focussing yokes 43, 44, a tracking magnet 45 and a tracking yoke 46. The electromagnetic driving unit 37 operates to drive and displace the bobbin 36 along the axis of the pivot 39, by the current corresponding to the focussing error signals being supplied to the focussing coil 48 via a flexible cable 50. The electromagnetic driving unit 37 operates to cause rotation of the bobbin 36 about the axis of the pivot 39 by the current corresponding to the tracking error signals being supplied to the tracking coil 49 via the flexible cable 50.

On the inner side of the tracking coil 49 is fixedly mounted a metal piece 51 for setting the neutral position of the bobbin 36, as shown in FIG. 3. By the metal piece 51 being attracted to the boundary between two poles formed by dividing the sole surface of the tracking magnet 45, the bobbin 36 is set at the neutral position in the tracking direction corresponding to the second direction, while being set at the neutral position in the focussing direction corresponding to the second direction.

In this first optical system 11, the so-called astigmatic method and the so-called three-spot and three-beam method, are used as the focussing servo method and as the tracking servo method, respectively. The astigmatic method consists of detecting the reflected laser light from the third optical disc 8 by a four-segment photodetector via a cylindrical lens and finding the sum and/or the difference of the detection outputs from the respective segments to derive the focussing error signals corresponding to the defocussing components of the laser light with respect to the signal recording surface. The three-spot method splits a sole main laser light beam radiated from the light source into a main laser light beam and two auxiliary laser light beams and illuminates the two auxiliary laser light beams ahead and behind the main laser light beam illuminated on the center of the recording track. The reflected laser light beams of the auxiliary laser light illuminated ahead and behind the main laser light beam are detected by two photodetectors and the difference between the detection outputs of the respective photodetectors is found to derive the tracking error signals representing deviation components of the main laser light beam with respect to the recording track. It is noted that, if the first optical system 11 uses the three-beam method as the tracking servo method, it is desirable that the double lens type objective lens unit 22 be mounted on the bobbin 36 so that the center $O_f$ of the forward lens is positioned on the straight line L, in order to reduce the adverse effects otherwise caused by the amount of deviation of the third optical disc 8 in the tangential direction at the time of the feed operation along the radius of the third optical disc 8.

Although not shown, the disc player provided with this optical pickup device 1 includes a turntable on which to set the first to third optical discs 6 to 8 and a spindle motor for rotationally driving the turntable. The first to third optical discs 6 to 8 are set on the same turntable for rotation thereon.

Figure 5:
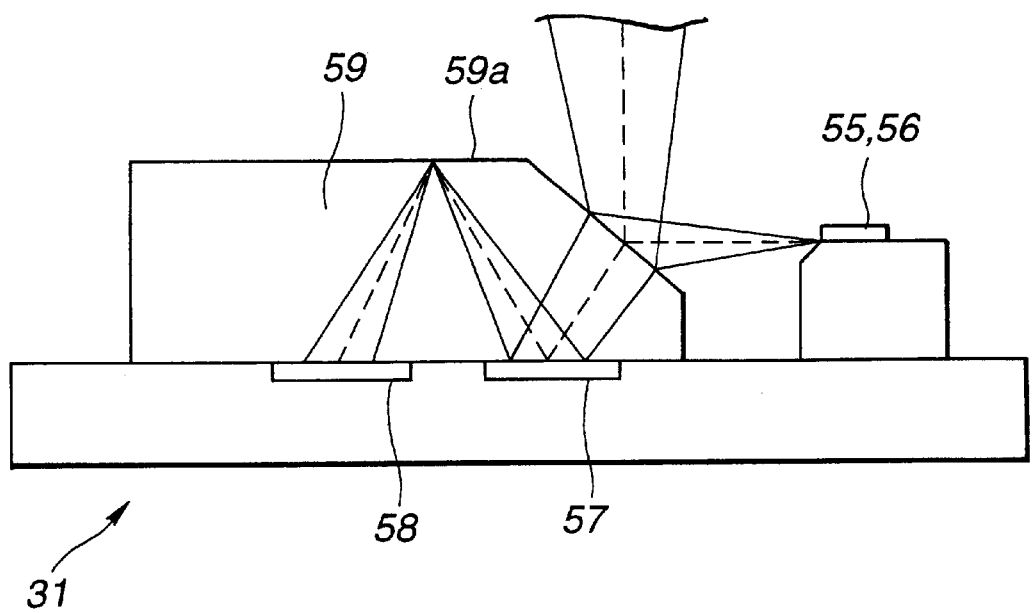
FIG. 5 is a schematic view showing a laser coupler provided on the second optical system of the optical pickup device.

Referring to FIG. 5, the laser coupler 31 provided on the second optical system 12 includes a first semiconductor laser 55 for radiating the laser light of the wavelength of 760 to 800 nm, a second semiconductor laser 56 for radiating the laser light of the wavelength of 635 to 650 nm, a first photodetector 57 and a second photodetector 58 for receiving the reflected laser light beams of the first semiconductor laser 55 and the second semiconductor laser 56 and for transmitting the reflected laser light from the first or second optical disc 5, 6.

Figure 6:
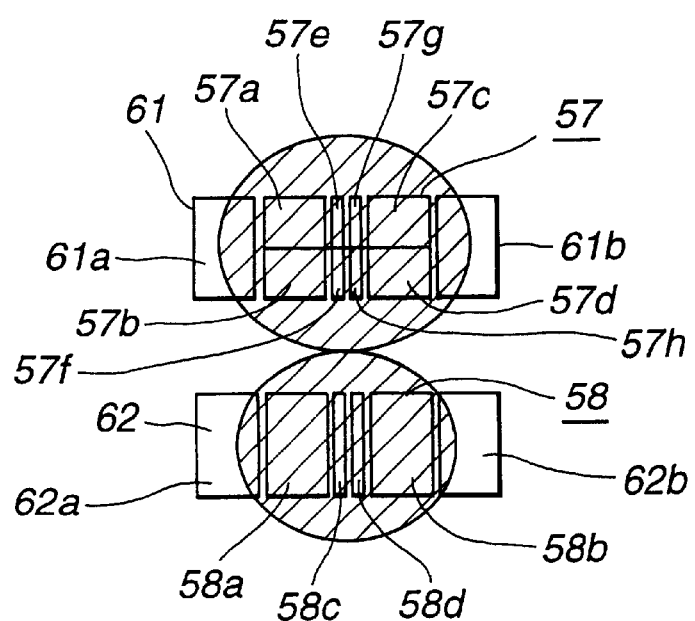
FIG. 6 is a plan view showing first and second photodetectors of the laser coupler and a gap detecting photodetector.

Referring to FIG. 6, the first photodetector 57 includes eight segment detection areas 57a to 57h for obtaining the tracking error signals at the time of reproducing the second optical disc 7, while the second photodetector 58 includes strip-like four-segment detection areas 58a to 58d. The first and second photodetectors are provided at an equal position from the focal point of the objective lens 34.

The first photodetector 57 is designed as a half mirror and reflects part of the reflected laser light received by the first photodetector 57. An optical prism 59 reflects the laser light reflected by the first photodetector 57 from a reflecting surface 59a to cause the reflected light to fall on the second photodetector 58. That is, the reflecting surface 59a of the optical prism 59 is conjugate with respect to the signal recording surfaces of the first and second optical discs 6, 7.

Figure 7:
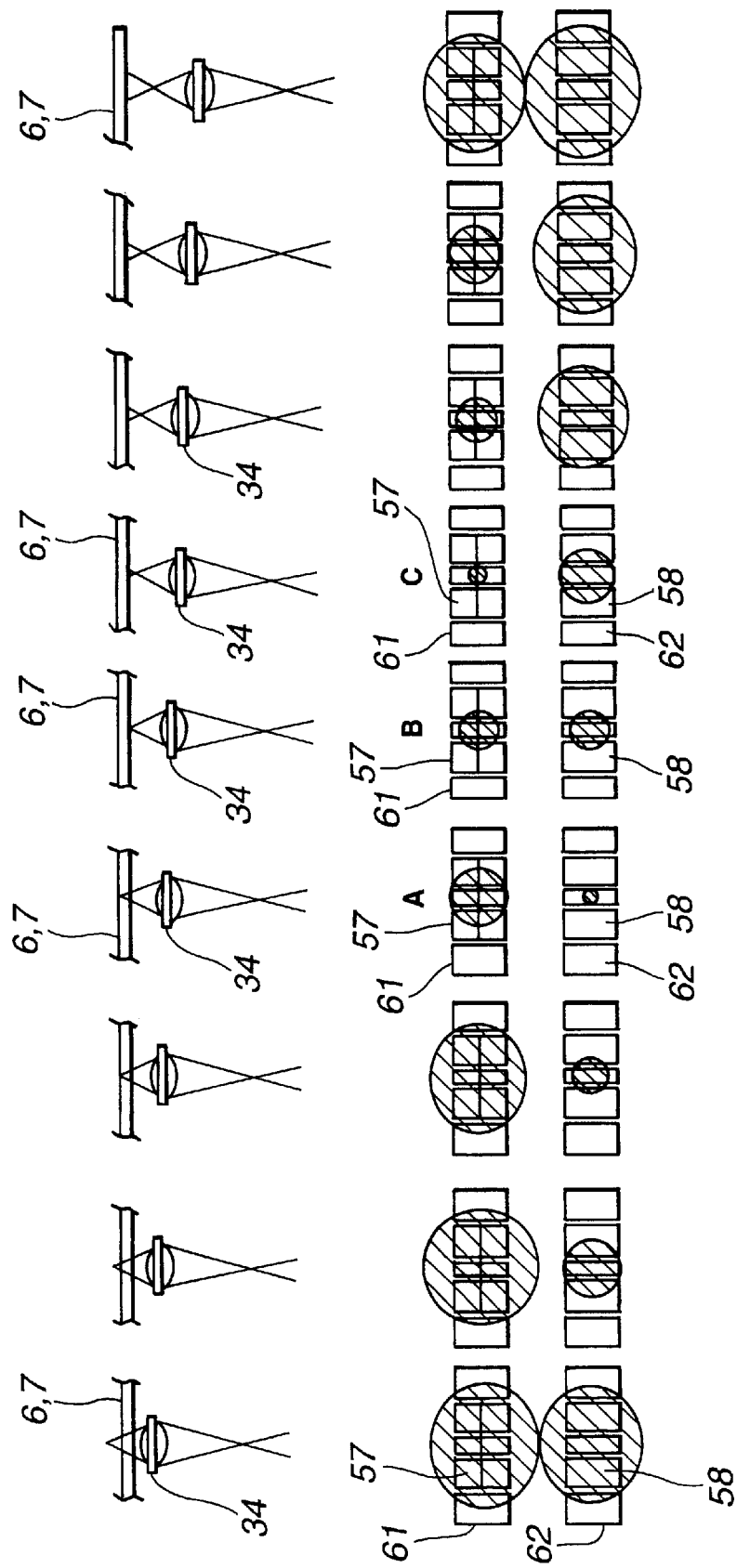
FIG. 7 shows the state of light detection by the first and second photodetectors.

Referring to FIG. 7, the first and second photodetectors are so designed that, as the objective lens 34 is moved in the focussing direction with respect to the first and second optical discs 6, 7, the spot of the reflected laser light beam on the detection areas 57a to 57h and 58a to 58h is changed concentrically.

If the objective lens 34 is moved away from the first optical disc 6 or the second optical disc 7, the spot on the first photodetector 57 is gradually decreased in diameter to be focussed thereon. If the objective lens is further away from the first optical disc 6 or the second optical disc 7, the spot on the first photodetector 57 is enlarged and defocussed. If the objective lens 34 approaches to the first optical disc 6 or the second optical disc 7, the spot diameter on the second photodetector 58 is decreased, while that on the first photodetector 57 is enlarged.

As for the spot diameters on the first and second photodetectors 57, 58, the state shown in FIG. 7A corresponds to the state in which the objective lens 34 is far from the first optical disc 6 or the second optical disc 7 while that shown in FIG. 7B corresponds to the state in which the objective lens 34 is focussed relative to the first optical disc 6 or the second optical disc 7 and that shown in FIG. 7C corresponds to the state in which the objective lens 34 approaches to the first optical disc 6 or the second optical disc 7.

With the first and second photodetectors 57, 58, the focussing error signals F can be found by finding the difference between the detection areas 57a to 57h and 58a to 58h and by calculating the equation:

$$F=\{(57a+57b)+(57c+57d)+58c+58d\}-\{58a+58b+(57e+57f)+(57g+57h)\}.$$

Also, the first and second photodetectors 57, 58 detect zero-crossing of the focussing error signals F in order to focus the objective lens 34 with respect to the first optical disc 6 or the second optical disc 7.

Also, in the present embodiment, the difference between the detection output of the inner detection areas 57e, 57f, 57g and 57h and 58c, 58d and that of the outer detection areas 57a, 57b, 57c and 57d and 58a, 58b of the first and second photodetectors 57, 58 is found and subsequently the difference between the detection outputs of the first and second photodetectors 57, 58 is found. Thus, on focussing, detection outputs of the first and second photodetectors 57, 58 are each equal to zero. This system is routinely termed the differential three-segment method.

Adjacent to the detection areas 57a to 57d and 58a, 58b of the first and second photodetectors 57, 58, there are provided first and second gap detecting photodetectors 61, 62 for detecting the separation between the third optical disc 8 and the double lens type objective lens unit 22. The gap detecting photodetectors 61, 62 are provided with two-segment detection areas 61a, 61b and 62a, 62b, as shown in FIG. 6. These two-segment detection areas 61a, 61b and 62a, 62b are provided on both sides of the detection areas 57a to 57h and 58a to 58d of the first and second photodetectors 57, 58.

The second optical system 12 is responsive to detection signals of the first and second gap detecting photodetectors 61, 62 to effectuate focussing servo of the double lens type objective lens unit 22 of the first optical system 11. The second optical system 12 has a pull-in area broader than that of the focussing servo of the first optical system 11.

The first and second gap detecting photodetectors 61, 62 receive the reflected laser light from the third optical disc 8 to detect the axial distance between the third optical disc 8 and the double lens type objective lens unit 22 in a state in which the objective lens 34 is positioned between the focal point of the objective lens 34 and the third optical disc 8, that is in which the objective lens 34 is closer to the third optical disc 8 than the focal point of the objective lens 34.

Meanwhile, the above-described second optical system 12 can reproduce the first optical disc 6 or the second optical disc 7. However, if the second optical system 12 is used only as gap detection means, it is also possible to use a routine optical pickup unit capable of reproducing the first optical disc 6, for example, subject to modification of the multiplying factor of the objective lens. In the optical pickup unit, the objective lens has a transverse multiplying factor of the order of 4.0 to 5.5, with the focussing servo pull-in range being set to ±5 to 15 μm. In an optical system employing the so-called astigmatic method or the differential three-segment method for focussing servo, since the focussing servo pull-in range depends on the separation between the forward side focal point and the rear side focal point of the objective lens, it is the longitudinal multiplying factor of the objective lens that is optically relevant.

The focussing servo pull-in range of the present optical pickup unit can be enlarged by reducing the transverse multiplying factor of the objective lens. Since the longitudinal multiplying factor of the objective lens is the transverse multiplying factor multiplied by itself, the longitudinal multiplying factor is 16 to 30, so that, for obtaining the pull-in range of ±0.2 mm, $$\{0.74/(0.2 \times 0.2 \times 2\}^{1/2} = 1$$

if the distance between the first and second photodetectors in terms of air is 0.74. Thus, by employing an objective lens having a transverse multiplying factor of 1, the focussing servo pull-in range can be increased by ±0.2 mm=200 μm.

That is, the second optical system 12 having a focussing servo pull-in range broader than that of the first optical system 11 can be fabricated easily and cheaply by substituting the objective lens having a transverse multiplying factor of the order of 1 for the conventional objective lens of the optical pickup unit.

If the transverse multiplying factor of the objective lens is modified, the track pitch is less than the cut-off. Therefore, any other suitable method, such as the so-called three-segment method, may be used as the focussing servo method.

As to the above-described optical pickup device 1, the operation of the first optical system 11 reproducing the third optical disc 8 and that of the second optical system 12 reproducing the first optical disc 6 or the second optical disc 7 are hereinafter explained.

First, the disc player having the optical disc device 1 discerns whether the loaded optical disc is the first optical disc 6, second optical disc 7 or the third optical disc 8, by disc discerning means, not shown. If the third optical disc 8 is to be reproduced, the first optical system 11 is responsive to the discrimination signal of the disc discerning means to emit the laser light with the wavelength of, for example, 515 nm.

If the third optical disc 8 is to be reproduced by the optical pickup device 1, the second optical system 12 operates as the gap-detecting optical system for detecting the separation between the third optical disc 8 and the double lens type objective lens unit 22 and detects the axial separation between the third optical disc 8 and the double lens type objective lens unit 22 by the laser light emitted by the laser coupler 31 being reflected by the third optical disc 8 and by the reflected light being received by the gap detecting photodetectors 61, 62.

If, in the optical disc device 1, the double lens type objective lens unit 22 is significantly deviated from the pull-in range of the focussing servo of the first optical system 11, the focussing error signals approach to zero. However, in this case, the output of the RF signals is decreased to detect the position of the double lens type objective lens unit 22 with respect to the focussing point.

Figure 8:
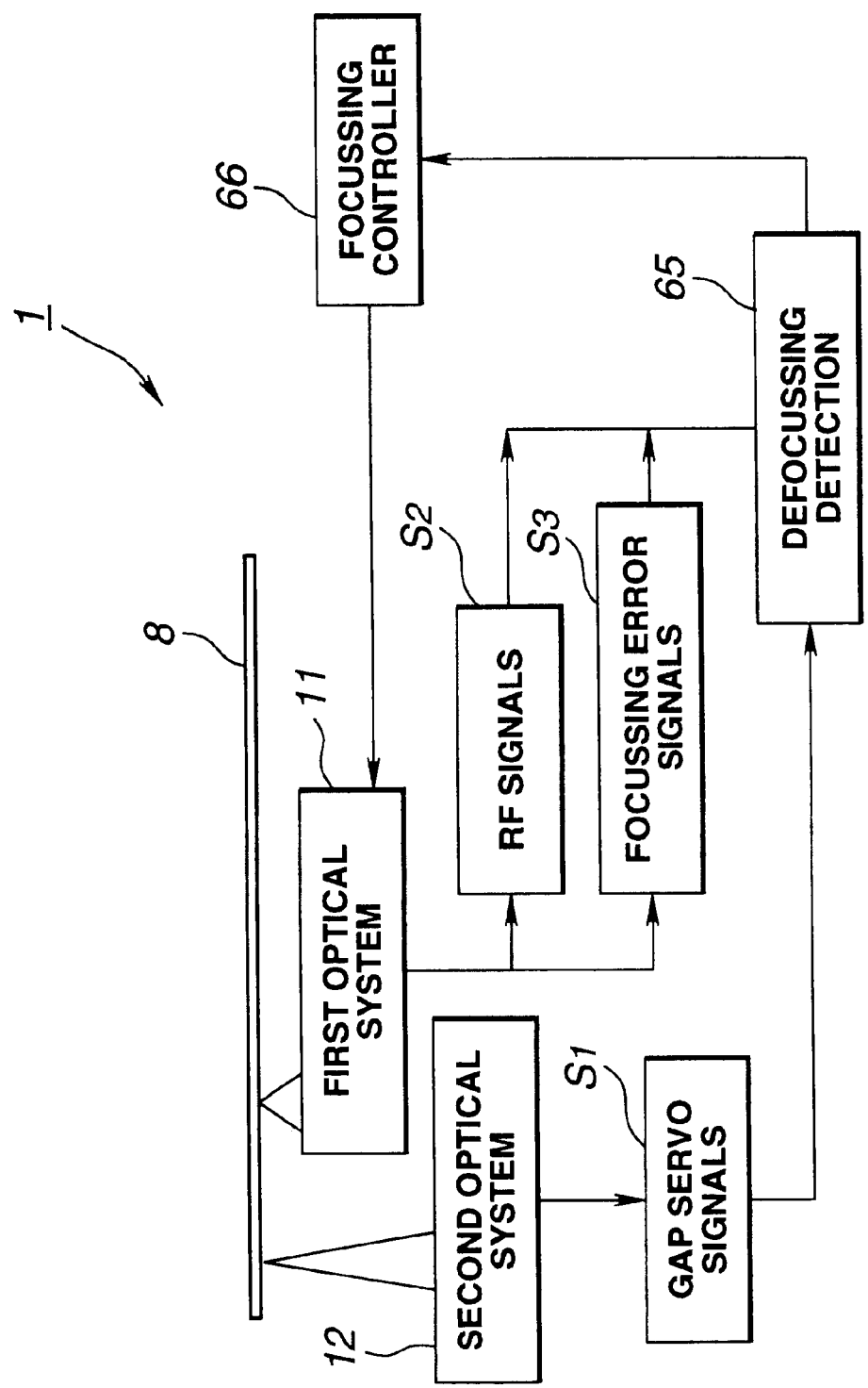
FIG. 8 is a block diagram for illustrating the focussing control in the optical pickup device.

In the optical disc device 1, a defocussing detector 65 outputs defocussing signal of the double lens type objective lens unit 22, based on a gap servo signal S1 outputted by the gap detecting photodetectors 61, 62 of the second optical system 12, focussing error signals S3 outputted by the first optical system 11 and on the RF signals S2, as shown in FIG. 8, in order to output control signals to the first optical system 11, whereby the double lens type objective lens unit 22 is moved to a focussing servo pull-in range. Therefore, the first optical system 11 can focussing-control the double lens type objective lens unit 22 with respect to the third optical disc 8. The first optical system 11 of the optical disc device 1 effectuates tracking control fthe forward lens 23 of the double lens type objective lens unit 22 so that the first optical system 11 reproduces the information signals from the high recording density disc which is the third optical disc 8.

Also, if, in the optical disc device 1, the second optical system 12 reproduces the first optical disc 6 or the second optical disc 7, the objective lens 34 of the double lens type objective lens unit 22 of the first optical system 11 is moved and retreated in a direction away from the first optical disc 6 or the second optical disc 7. Thus, the second optical system 12 is responsive to the detection signals of the gap detecting photodetectors 61, 62 to prevent collision of the first optical disc 6 or the second optical disc 7 with the double lens type objective lens unit 22.

When the optical disc device 1 reproduces the first optical disc 6, the first semiconductor laser 55 of the second optical system 12 radiates the laser light having the wavelength of, for example, 780 nm. The second optical system 12 effectuates focussing control and tracking control of the objective lens 34 so that the second optical system 12 reproduces information signals from the CD or CD-R which is the first optical disc 6.

When the optical disc device 1 reproduces the second optical disc 7, the second semiconductor laser 56 of the laser coupler 31 of the second optical system 12 radiates the laser light having the wavelength of, for example, 635 nm. The second optical system 12 effectuates focussing control and tracking control of the objective lens 34 so that the second optical system 12 reproduces information signals from the DVD which is the second optical disc 7.

If, with the optical disc device 1, the double lens type objective lens unit 22 is deviated from the focussing servo pull-in range due to disturbances, when the first optical system 11 reproduces the third optical disc 8, the second optical system 12 can promptly restore the double lens type objective lens unit 22 to within the focussing servo pull-in range of the first optical system 11. Therefore, with the present optical disc device 1, the third optical disc 8 can be positively prevented from colliding against the double lens type objective lens unit 22.

Also, with the present optical disc device 1, the entire device can be reduced in size by the provision of the double lens type objective lens unit 22 and the objective lens 34 on the same bobbin 36.

The optical disc device 1 is configured so that the bobbin 36 carrying the double lens type objective lens unit 22 and the objective lens 34 is rotated about the pivot 39 as center. However, the optical disc device 1 may also be configured so that the bobbin is supported on the distal ends of plural linear elastic supporting members having the proximal ends supported by the stationary portion, and so that the double lens type objective lens unit 22 and the objective lens 34 carried by the bobbin are driven and displaced in the directions parallel and normal to the optical axis. Such an optical pickup device 2 is now explained with reference to the drawings. In this optical pickup device 2, the members which are the same as those of the above-mentioned optical disc device 1 are dented by the same reference numerals and are not explained specifically.

Figure 9:
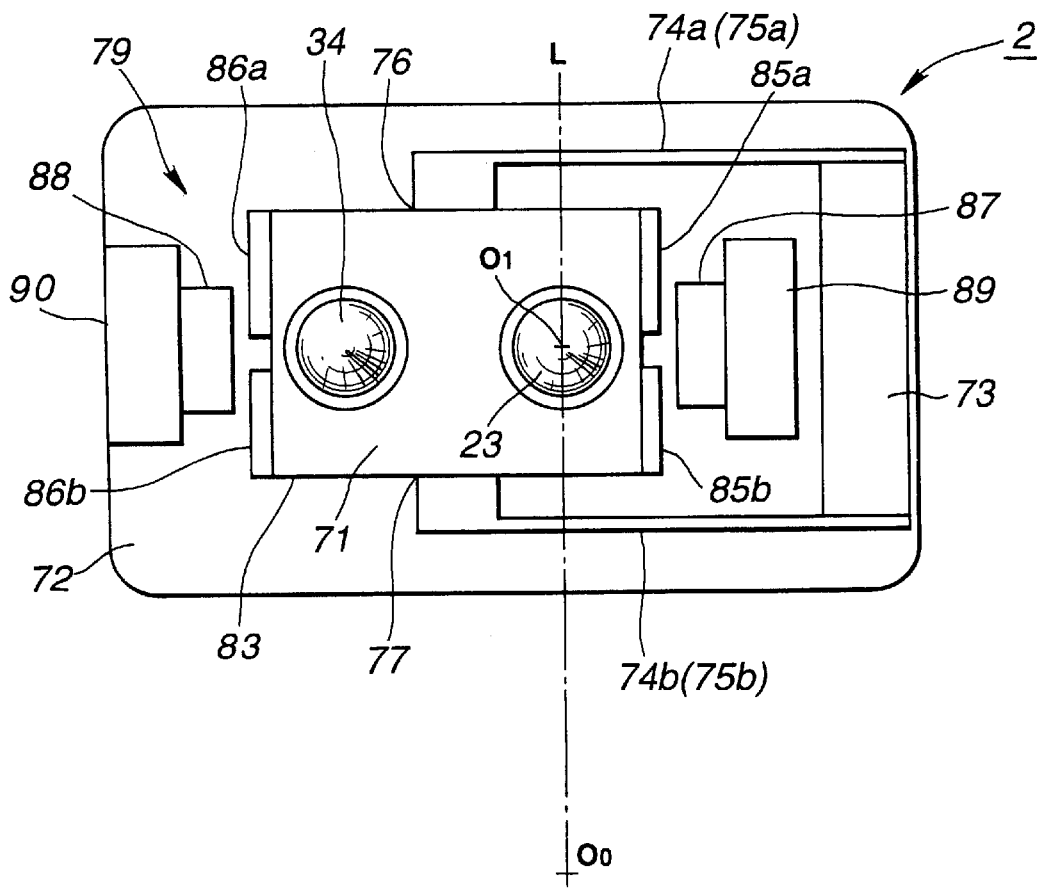
FIG. 9 is a plan view showing another bobbin and the electromagnetic driving unit 37.
Figure 10:
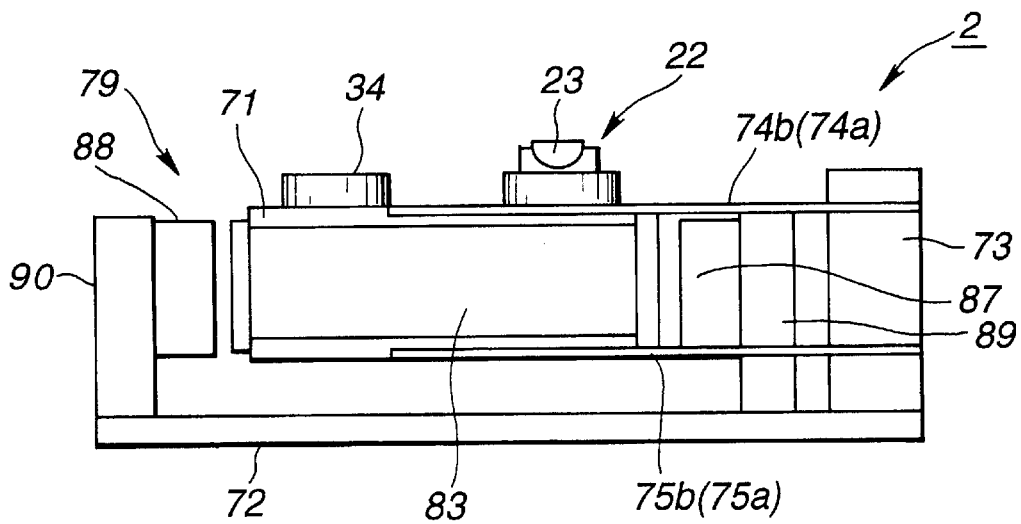
FIG. 10 is a side view showing the other bobbin and the electromagnetic driving unit.

Referring to FIGS. 9 and 10, the optical pickup device 2 has a rectangular-shaped bobbin 71 carrying the double lens type objective lens unit 22 and the objective lens 34 side-by-side. On the bobbin 71, the forward lens 23 of the double lens type objective lens unit 22 is mounted so that its center $O_1$ is disposed on the straight line L passing through the center of rotation $O_0$ of the first to third optical discs 6 to 8.

The bobbin 71 has its proximal end secured to a stationary portion 73 provided on the optical block 41, and has its longitudinal sides carried by elastic supporting members 74a, 74b and 75a, 75b, extended in a direction substantially perpendicular to the optical axes of the double lens type objective lens unit 22 and the objective lens 34, whereby the bobbin 71 is supported for movement in the focussing direction, that is, in the first direction parallel to the optical axes of the double lens type objective lens unit 22 and the objective lens 34, and in the tracking direction, that is, in the first direction perpendicular to the optical axes of the double lens type objective lens unit 22.

The elastic supporting members 74a, 74b and 75a, 75b, movably supporting the bobbin 71, are formed by linear elastic metallic pieces formed of, for example, phosphor bronze. Referring to FIG. 9, the distal ends of the elastic supporting members 74a, 74b and 75a, 75b are secured to supports 76, 77 protuberantly formed in both opposite longitudinal sides of the bobbin 71 along which the double lens type objective lens unit 22 and the objective lens 34 are arrayed side-by-side, so that the bobbin 71 is carried for movement in the focussing direction parallel to the optical axes of the double lens type objective lens unit 22 and the objective lens 34, and in the tracking direction perpendicular to the optical axes of the double lens type objective lens unit 22.

The bobbin 71, supported in a cantilevered fashion by the elastic supporting members 74a, 74b and 75a, 75b having the proximal ends supported by the stationary portion 73, is driven and displaced by the electromagnetic driving unit 79 in the focussing direction parallel to the optical axes of the double lens type objective lens unit 22 and the objective lens 34, and in the tracking direction perpendicular to the optical axes of the double lens type objective lens unit 22.

Specifically, the elastic supporting members 74a, 74b and 75a, 75b supporting the bobbin 71 and the electromagnetic driving unit 79 make up a driving mechanism for driving and displacing the double lens type objective lens unit 22 and the objective lens 34 in two mutually orthogonal directions, that is, in the focussing direction and in the tracking direction.

Referring to FIGS. 9 and 10, the electromagnetic driving unit 79 constituting the double lens type objective lens unit 22 and the objective lens 34 includes a focussing coil 83 placed around the outer periphery of the bobbin 71, flat rectangular tracking coils 85a, 85b, 86a, 86b, mounted in pairs on the lateral sides of the bobbin 71 in superposition on the focussing coil 83, a pair of magnets 87, 88 arranged facing the coils 83, 84, 85a, 85b, 86a, 86b, and rectangular yokes 89, 90 supporting these magnets 87, 88. Still referring to FIGS. 9 and 10, the magnets 87, 88 are affixed to the sides of yokes 89, 90 facing the focussing coil 83 and tracking coils 85a, 85b, 86a, 86b.

If the driving current corresponding to the focussing error signals are sent to the focussing coil 83 of the electromagnetic driving unit 79, the bobbin 71 is driven and displaced in the direction parallel to the optical axes of the double lens type objective lens unit 22 and the objective lens 34, by the interaction of the driving current with the magnetic flux from the magnets 87, 88, by way of effectuating focussing control of the double lens type objective lens unit 22 and the objective lens 34. If the driving current corresponding to the tracking error signals is supplied to the tracking coils 85a, 85b, 86a, 86b, the bobbin 71 is driven and displaced in a direction perpendicular to the optical axes of the double lens type objective lens unit 22 and the objective lens 34, by way of effectuating tracking control of the double lens type objective lens unit 22 and the objective lens 34.

In the above-described optical pickup device 1 and 2, the second optical system 12 includes first and second gap detecting photodetectors 61, 62, mounted in adjacency to the outer periphery of the first and second photodetectors 57, 58, these gap detecting photodetectors 61, 62 being designed to receive the outer rim portion of the laser spot of the reflected laser light received by the first and second photodetectors 57, 58. The optical pickup device 1 and 2 may, however, be provided with a laser coupler having first and second photodetectors and a gap detecting photodetector independently of the laser coupler.

Figure 11:
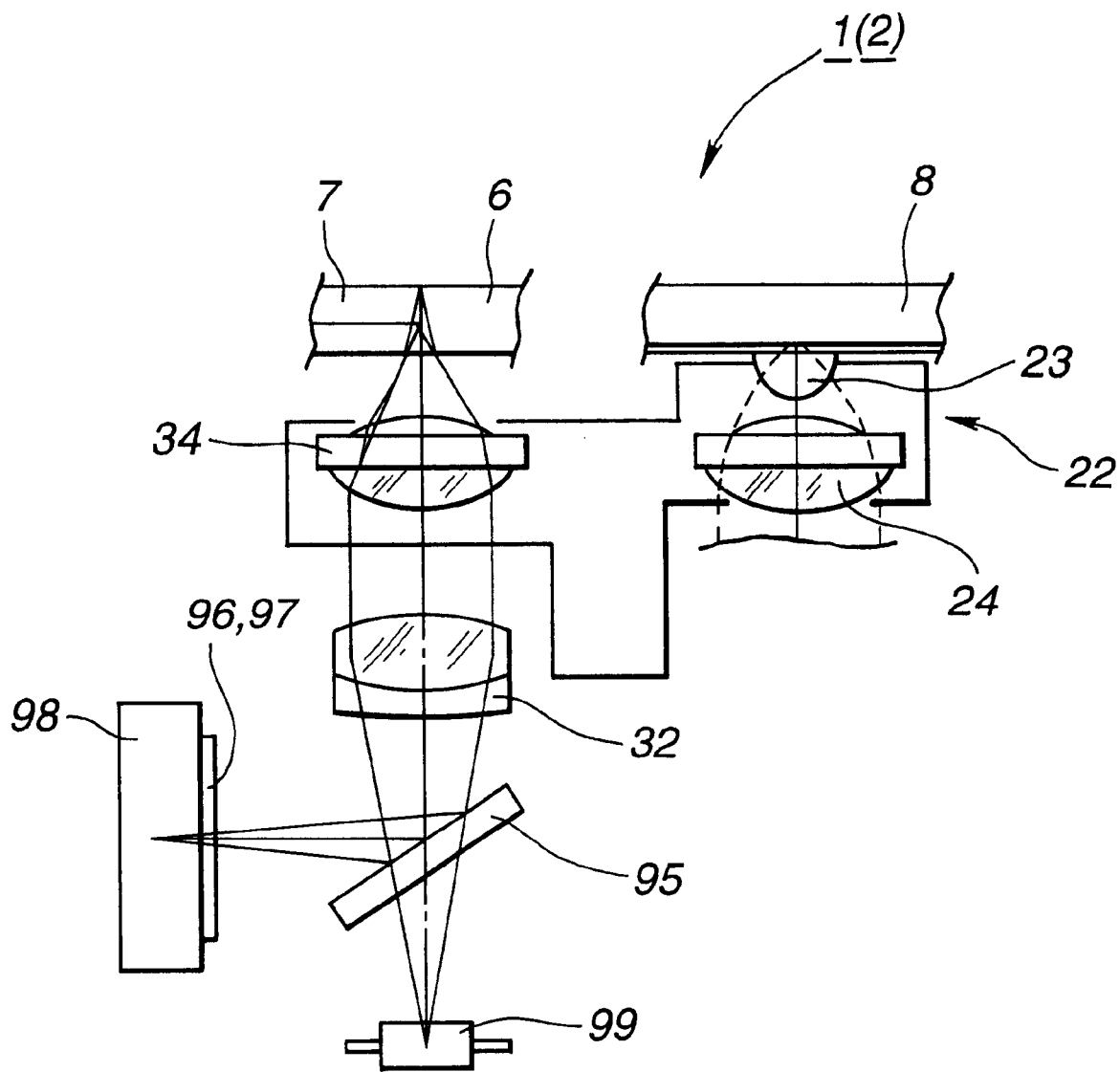
FIG. 11 is a schematic view showing another second optical system.

Referring to FIG. 11, this second optical system includes a half mirror 95, adapted for partially traversing and partially reflecting the reflected laser light, a laser coupler 98 having first and second photodetectors 96, 97 for receiving the reflected laser light, reflected by the half mirror 95, and a gap detecting photodetector 99 for receiving the reflected laser light traversing the half mirror 95. That is, this optical system can be easily adapted from the conventional coupler by simply adding the half mirror 95 and the gap detecting photodetector 99 to the optical path.

The first optical system 11 of the above-described optical pickup device 1 and 2 employs the three-spot method as a detection method for detecting the tracking error signals. However, the first optical system 11 may also use the so-called one-spot or one-beam method.

The optical pickup device of the present invention is applied to the optical discs, such as CD, DVD or the high recording density disc. However, it may also be applied to other optical recording mediums, such as magneto-optical discs or optical recording cards.

What is claimed is:

1. An optical pickup device comprising:
   a first optical system including an objective lens unit made up of a first lens arranged facing an optical disc and a second lens arranged with its optical axis coincident with the optical axis of the first lens;
   a second optical system having an objective lens and gap direction means for detecting the separation between a signal readout surface of the optical disc and the first lens of the objective lens unit;
   a bobbin carrying the objective lens unit of the first optical system and the second lens of the second optical system; and
   driving means for causing movement of the bobbin in a first direction parallel to the optical axes of the objective lens and the first lens of the objective lens unit and in a second direction perpendicular to said optical axes.

2. The optical pickup device according to claim 1 wherein the gap detection means reads out and reproduces the information signals from an optical disc having a variable thickness position of the signal recording surface thereof along the disc thickness.

3. The optical device according to claim 2 wherein said driving means includes a pivot for rotatably supporting the bobbin and for movement in a direction parallel to the direction of the optical axis;

there being provided on said bobbin the objective lens unit of said first optical system and the objective lens of said second optical system so that the objective lens unit and the objective lens are symmetrical with respect to the pivot.

4. The optical pickup device according to claim 2 wherein said driving means includes at least one elastic supporting member for supporting the bobbin for movement in said first direction and in said second direction, a stationary portion for carrying an end of said supporting member, a plurality of coils mounted on one of the bobbin and the stationary portion and at least magnet mounted on the other of the bobbin and the stationary portion for facing said coils.

5. The optical device according to claim 2 wherein said second optical system includes a first light source and a second light source for radiating laser light beams of different wavelengths to a plurality of optical discs having different positions of the signal recording surfaces thereof along the disc thickness;

said objective lens focusing laser light beams of different wavelengths on the signal recording surfaces of the plural optical discs.

6. The optical pickup device according to claim 1 wherein said first optical system includes focussing servo means for maintaining a constant separation between the first lens of the objective lens unit and the signal recording surface of the optical disc, with a pull-in range not less than ±2 $\mu$m and not larger than ±10 $\mu$m;

the gap detection means of said second optical system having a pull-up range broader than that of the focussing servo means, said first lens of the objective lens unit being moved to the pull-in range of said focussing servo means when the first lens of the objective lens unit is moved away from the pull-in range of said focussing servo means.

7. The optical pickup device according to claim 6 wherein the objective lend of said second optical system has a transverse multiplying factor approximately equal to 1.

8. The optical pickup device according to claim 6 wherein said gap detection means has a light source for radiating the laser light, an optical path branching optical device for branching the reflected laser light from the optical disc and a detection device for detecting the reflected laser light branched from the optical path branching optical device.

9. The optical pickup device according to claim 8 wherein said optical path branching optical device is an optical prism.

10. The optical pickup device according to claim 8 wherein said optical path branching optical device includes a hologram device.

11. The optical pickup device according to claim 6 wherein said second optical system includes focussing servo means having a first detection device for detecting the reflected laser light from the optical disc for maintaining a constant distance between the objective lens and the signal recording surface of the optical disc; and a second detection device for detecting the reflected laser light as the optical disc is positioned between the objective lens and the focal point of the objective lens.

12. The optical pickup device according to claim 11 wherein said second optical system is provided in adjacency to said first detection unit.

13. The optical pickup device according to claim 11 wherein for reproducing the optical disc by an objective lens, said gap detection means causes movement of the first lens of the objective lens unit in a direction away from the optical disc.

14. An optical disc device comprising:

a first optical system having a first objective lens unit for illuminating a light beam for forming a light spot on an optical disc;

first detection means for detecting the focussing of a light spot by said first optical system;

a second optical system having a second objective lens unit for illuminating a light beam for forming a light spot on an optical disc;

second detection means for detecting the focussing of a light spot by said second optical system;

a bobbin provided with the objective lens unit of the first optical system and with the objective lens unit of the second optical system; and driving means for causing movement of said bobbin in a first direction parallel to the optical axes of the first lens of the objective lens unit and the objective lens;

the focussing detection range by said second detection means being broader than that by said first detection means.

15. The optical disc device according to claim 14 wherein the objective lens unit includes a first lens arranged facing an optical disc and a second lens arranged with its optical axis coincident with the optical axis of the first lens.

16. The optical disc device according to claim 14 further comprising:

bobbin feed means for causing movement of said bobbin along the radius of an optical disc;

the first lens of the objective lens unit of the first optical system or the objective lens of the second optical system being mounted on the bobbin so that the center of the first lens is moved along a straight line traversing the center of rotation of an optical disc parallel to the direction of movement by said bobbin feed means.

17. The optical disc device according to claim 14 wherein the gap detection means reads out and reproduces the information signals from an optical disc having a position of the signal recording surface thereof along the disc thickness different from that of the optical disc of claim 14.

18. The optical disc device according to claim 17 wherein said driving means included a pivot for rotatably supporting the bobbin and for movement in a direction parallel to the direction of the optical axis;

there being provided on said bobbin the objective lens unit of said first optical system and the objective lens of said second optical system so that the objective lens unit and the objective lens are symmetrical with respect to the pivot.

19. The optical disc device according to claim 17 wherein said driving means includes at least one elastic supporting member for supporting the bobbin for movement in said first direction and in said second direction, a stationary portion for carrying an end of said supporting member, a plurality of coils on one of the bobbin and the stationary portion and at least one magnet on the other of the bobbin and the stationary portion so that the magnet faces said coils.

20. The optical disc device according to claim 17 wherein said second optical system includes a first light source and a second light source for radiating laser light beams of different wavelengths to a plurality of optical discs having different positions of the signal recording surfaces thereof along the disc thickness;

said objective lens focusing laser light beams of different wavelengths on the signal recording surfaces of the plural optical discs.

21. The optical disc device according to claim 14 wherein said first optical system includes focussing servo means for maintaining a constant separation between the first lens of the objective lens unit and the signal recording surface of the optical disc, with a pull-in range not less than ±2 μm and not larger than ±10 μm;

the second detection means of said second optical system having a pull-in range broader than that of the focussing servo means, said first lens of the objective lens unit being moved to the pull-in range of said focussing servo means when the first lens of the objective lens unit is moved away from the pull-in range of said focussing servo means.

* * * * *

UNITED STATES PATENT AND TRADEMARK OFFICE
CERTIFICATE OF CORRECTION

PATENT NO.   : 6,314,064 B1
DATED        : November 6, 2001
INVENTOR(S)  : Mitsunori Ueda It is certified that error appears in the above-identified patent and that said Letters Patent is hereby corrected as shown below:

Column 13,
Line 37, replace "lend" with -- lens --.

Column 14,
Line 41, replace "included" with -- includes --.
Lines 54 and 55, replace "bobbin" with -- bobbins --.

Signed and Sealed this

Eleventh Day of February, 2003

JAMES E. ROGAN
*Director of the United States Patent and Trademark Office*